(12) United States Patent
Kuge

(10) Patent No.: US 8,743,090 B2
(45) Date of Patent: Jun. 3, 2014

(54) DISPLAY DEVICE WITH INPUT UNIT, CONTROL METHOD FOR SAME, CONTROL PROGRAM AND RECORDING MEDIUM

(75) Inventor: Yoichi Kuge, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 102 days.

(21) Appl. No.: 13/638,385

(22) PCT Filed: Nov. 24, 2010

(86) PCT No.: PCT/JP2010/070927
§ 371 (c)(1),
(2), (4) Date: Sep. 28, 2012

(87) PCT Pub. No.: WO2011/121842
PCT Pub. Date: Oct. 6, 2011

(65) Prior Publication Data
US 2013/0021244 A1    Jan. 24, 2013

(30) Foreign Application Priority Data
Mar. 29, 2010    (JP) .................................. 2010-075141

(51) Int. Cl.
*G09G 5/00*    (2006.01)
(52) U.S. Cl.
USPC ........... 345/175; 345/156; 345/173; 345/179; 178/19.05
(58) Field of Classification Search
USPC .......... 345/156, 157, 87, 173, 179; 178/19.05
See application file for complete search history.

(56) References Cited

U.S. PATENT DOCUMENTS

| | | | | |
|---|---|---|---|---|
| 2004/0189621 | A1* | 9/2004 | Cho et al. | 345/179 |
| 2007/0188478 | A1* | 8/2007 | Silverstein et al. | 345/179 |
| 2008/0211786 | A1* | 9/2008 | Park et al. | 345/175 |
| 2011/0043489 | A1 | 2/2011 | Yoshimoto et al. | |
| 2011/0169746 | A1 | 7/2011 | Kitajima | |

FOREIGN PATENT DOCUMENTS

| | | |
|---|---|---|
| JP | H09-114588 A | 5/1997 |
| JP | 9-179687 A | 7/1997 |
| JP | 2002-182839 A | 6/2002 |
| JP | 2005-346453 A | 12/2005 |
| JP | 2007-241410 A | 9/2007 |
| JP | 2009-064109 A | 3/2009 |
| WO | 2009/139214 A1 | 11/2009 |
| WO | 2011/102038 A1 | 8/2011 |

OTHER PUBLICATIONS

U.S. Appl. No. 13/578,723, filed Aug. 13, 2012.

\* cited by examiner

*Primary Examiner* — Jennifer Nguyen
(74) *Attorney, Agent, or Firm* — Chen Yoshimura LLP

(57) ABSTRACT

Disclosed is a display device equipped with an input section that can be operated accurately. A display device equipped with an input section (50) of the present invention includes a correcting section (39), which includes a sensor location detecting section (28) that detects the location of the optical axis of light projected from the light-projecting section. To the sensor location detecting section (28), the location information of a pointer is inputted as the location of the optical axis of the light. The correcting section (39) also includes a sensor shape detecting section (29) that detects the shape of the light-receiving region receiving the light projected from the light-projecting section. The display device equipped with an input section (50) further includes a pointer location correcting section that corrects the pointer location. The pointer location correcting section corrects the location information of the pointer when the shape of the light-receiving region detected by the sensor shape detecting section (29) changes.

8 Claims, 9 Drawing Sheets

FIG. 2
(a)
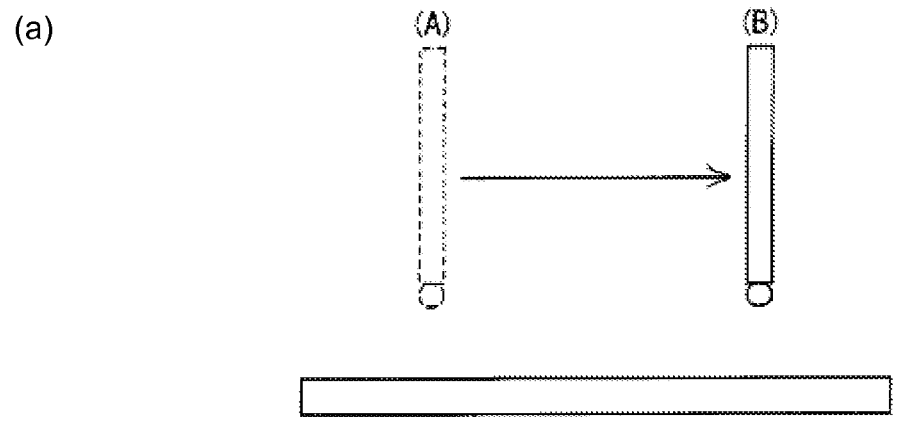
(b)
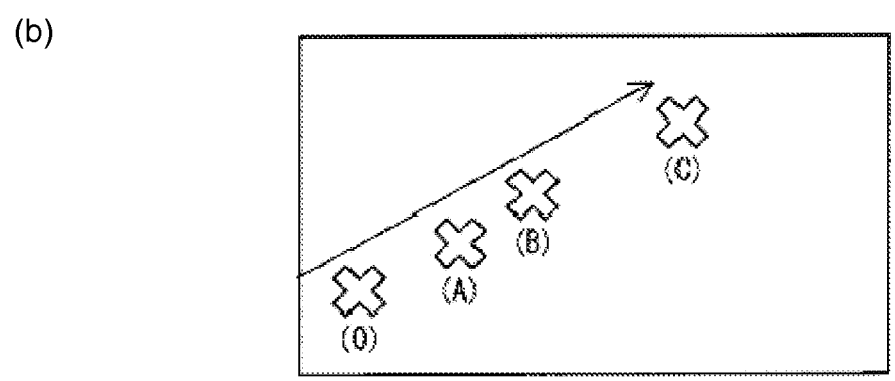
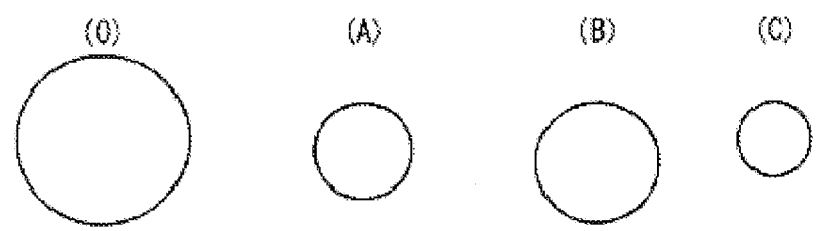

FIG. 3
(a)
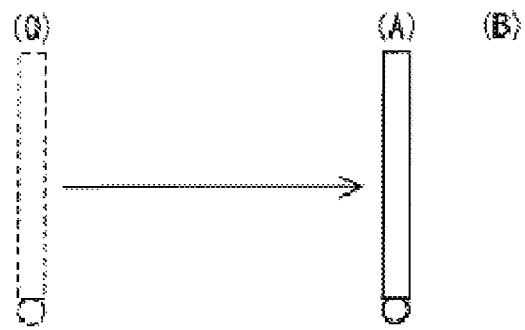
(b)
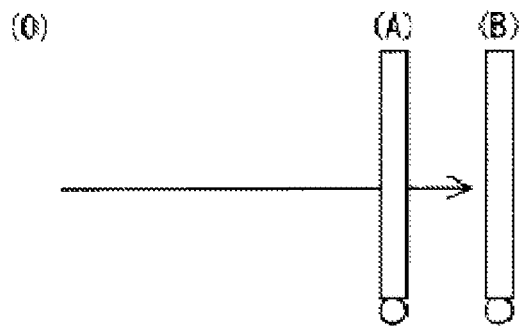

DISPLAY DEVICE WITH INPUT UNIT, CONTROL METHOD FOR SAME, CONTROL PROGRAM AND RECORDING MEDIUM

TECHNICAL FIELD

The present invention relates to a display device equipped with an input section, to a method for controlling the same, and also to a control program and a recording medium for the same. More particularly, the present invention relates to a display device equipped with an input section that can be operated accurately, to a method for controlling the same, and also to a control program and a recording medium for operating the same.

BACKGROUND ART

Conventionally, a keyboard, mouse, touch panel, digitizer, tablet, pen type input section, and the like are used as the input section for entering information to a display device. Among them, the pen type input section, which is used to move displayed images, to select commands, or to perform similar operations on the display device, is a light-emitting pen, by which information is entered to a plate-shaped member that displays images associated to the images displayed on the display device.

Patent Document 1, for example, discloses a pen type input device that determines the coordinates of a point on a displayed image by detecting the distance that the tip of the pen moves and the direction of the movement. Specifically, Patent Document 1 discloses a pen type input device 2, which, as shown in FIG. 10, includes: a light source 104 that emits laser light to a writing surface 101; a photodiode 105 that detects the speckle pattern generated by the reflection against the writing surface 101; a moving amount calculation element that obtains the speed at which the pen tip moves based on the time correlation width of the detected speckle pattern, and calculates the moving amount by integrating the moving speed; a stress sensor 103 that detects stress in two directions that cross a pen axis 118 at a right angle; and a moving direction detecting element that detects the direction of the movement of the pen tip over the writing surface 101 based on the detected stress in two directions.

RELATED ART DOCUMENTS

Patent Documents

Patent Document 1: Japanese Patent Application Laid-Open Publication No. H9-114588 (published on May 2, 1997)

SUMMARY OF THE INVENTION

Problems to be Solved by the Invention

However, the pen type input device disclosed in Patent Document 1 has a problem that the movement of the pointer shown on the displayed image lags behind the pen movement, which prevents accurate operation.

The present invention was devised in consideration of the problem described above, and is aiming at providing a display device equipped with an input section that can be accurately operated, a method for controlling the same, and a control program and a recording medium for operating the same.

Means for Solving the Problems

In consideration of the problems described above, the inventor of the present invention investigated the reason that, when the pen type input devise disclosed in Patent Document 1 is used, the movement of the pointer shown on the displayed image lags behind the movement of the pen. The investigation revealed that, with the pen type input device disclosed in Patent Document 1, by the time the pointer appears on the displayed image, the pen has already moved away from the location of the pointer, because the coordinates determination process is conducted sequentially.

The inventor then identified the relationship between the shape of the light-receiving region formed by the light projected from the light-projecting section and the moving amount of the pointer on the displayed image, and independently found that the pointer location can be corrected based on the shape of the light-receiving region, and by correcting the pointer location, the pointer on the displayed image does not lag behind the movement of the light-projecting section, which lead to completion of the present invention.

That is, in order to solve the problems described above, a display device equipped with an input section of the present invention includes: a display section that displays a main image; and an input section for inputting the location information of a pointer to be displayed on the display section, wherein the input section includes a light detecting section that detects light projected from a light-projecting section, wherein a correcting section includes a light location detecting section that detects an optical axis of light projected from the light-projecting section, and location information of the pointer is inputted to the light location detecting section as the location of the optical axis of light, wherein the correcting section includes a light shape detecting section that detects the shape of a light-receiving region receiving light from the light-projecting section, wherein the display device further includes a pointer location correcting section that corrects locations of the pointer, and wherein the pointer location correcting section corrects the location information of the pointer when the shape of the light-receiving region detected by the light shape detecting section changes.

According to the configuration described above, because the light location detecting section can detect the location of light, the location of the pointer on the main image before correction can be determined. Further, because the location of light can continuously be detected by the light location detecting section, when the light-projecting section is moved, the correction direction (moving direction) from the pointer location on the main image before correction can be determined. Also, because the shape of the light-receiving region can be detected by the light shape detecting section, the correction amount (moving amount) from the pointer location on the main image before correction can be determined.

Also, according to the configuration described above, because the pointer location correcting section is included, the location of the pointer on the main image after correction can be determined.

Thus, when the light-projecting section is moved, the pointer can be displayed on the main image without a lag behind the location of the light projected from the light-projecting section. As a result, the display device equipped with an input section of the present invention can be operated accurately.

A method for controlling the display device equipped with an input section of the present invention includes: a display step in which a main image is displayed on a display section; and an input step in which location information of a pointer to be displayed on the display section is inputted, wherein the input step includes a light detection step in which light projected in a light projection step is detected, wherein a correction step includes a light location detection step in which the location of an optical axis of the light projected in the light projection step is detected, and the location information of the pointer is inputted to the light location detection step as the location of the optical axis of light, wherein the correction step includes a light shape detection step in which the shape of the light-receiving region receiving the light projected in the light projection step is detected, wherein the method for controlling the display device further includes a pointer location correction step in which the location of the pointer is corrected, and wherein in the pointer location correction step, the location information of the pointer is corrected when the shape of the light-receiving region detected in the light shape detection step changes.

According to the configuration described above, because the light location can be detected in the light location detection step, the pointer location on the main image before correction can be determined. Further, because the location of light can continuously be detected in the light location detection step, when the light is moved in the light projection step, the correction direction (moving direction) from the pointer location on the main image before correction can be determined. Also, because the shape of the light-receiving region can be detected in the light shape detection step, the correction amount (moving amount) from the pointer location on the main image before correction can be determined.

Also, according to the configuration described above, because the pointer location correction step is included, the pointer location on the main image after correction can be determined.

Thus, when the light is moved in the light projection step, the pointer can be displayed on the main image without a lag behind the location of the light. As a result, the method for controlling the display device equipped with an input section of the present invention enables the display device to be operated accurately.

Effects of the Invention

As described above, the display device equipped with an input section of the present invention includes: a display section that displays a main image; and an input section for inputting the location information of a pointer to be displayed on the display section, wherein the input section includes a light detecting section that detects light projected from a light-projecting section, wherein a correcting section includes a light location detecting section that detects the optical axis of light projected from the light-projecting section, and location information of the pointer is inputted to the light location detecting section as the location of the optical axis of light, wherein the correcting section includes a light shape detecting section that detects the shape of a light-receiving region receiving light from the light-projecting section, wherein the display device further includes a pointer location correcting section that corrects locations of the pointer, and wherein the pointer location correcting section corrects the location information of the pointer when the shape of the light-receiving region detected by the light shape detecting section changes.

As a result, a display device equipped with an input section of the present invention can be operated accurately.

A method for controlling the display device equipped with an input section of the present invention includes: a display step in which a main image is displayed on a display section; and an input step in which location information of a pointer to be displayed on said display section is inputted, wherein the input step includes a light detection step in which light projected in a light projection step is detected, wherein a correction step includes a light location detection step in which the location of the optical axis of the light projected in the light projection step is detected, and the location information of the pointer is inputted to the light location detection step as the location of the optical axis of light, wherein the correction step includes a light shape detection step in which the shape of the light-receiving region receiving the light projected in the light projection step is detected, wherein the method for controlling the display device further includes a pointer location correction step in which the location of the pointer is corrected, and wherein in the pointer location correction step, the location information of the pointer is corrected when the shape of the light-receiving region detected in the light shape detection step changes.

As a result, a display device equipped with an input section of the present invention can be operated accurately.

BRIEF DESCRIPTION OF THE DRAWINGS

FIG. 2 schematically shows the operation of the display device equipped with an input section of the present invention. FIG. 2(a) shows the locations of a pen (light-projecting section), and FIG. 2(b) shows the locations and shapes of the light.

FIG. 3 schematically shows the locations of a pen (light-projecting section) of the display device equipped with an input section of the present invention.

FIG. 5 schematically shows the arrangement of optical sensors in the display panel (display section) of the present invention.

FIG. 9 schematically shows the location of the light projected on the display device equipped with an input section of the present invention.

DETAILED DESCRIPTION OF EMBODIMENTS

Figure 1:
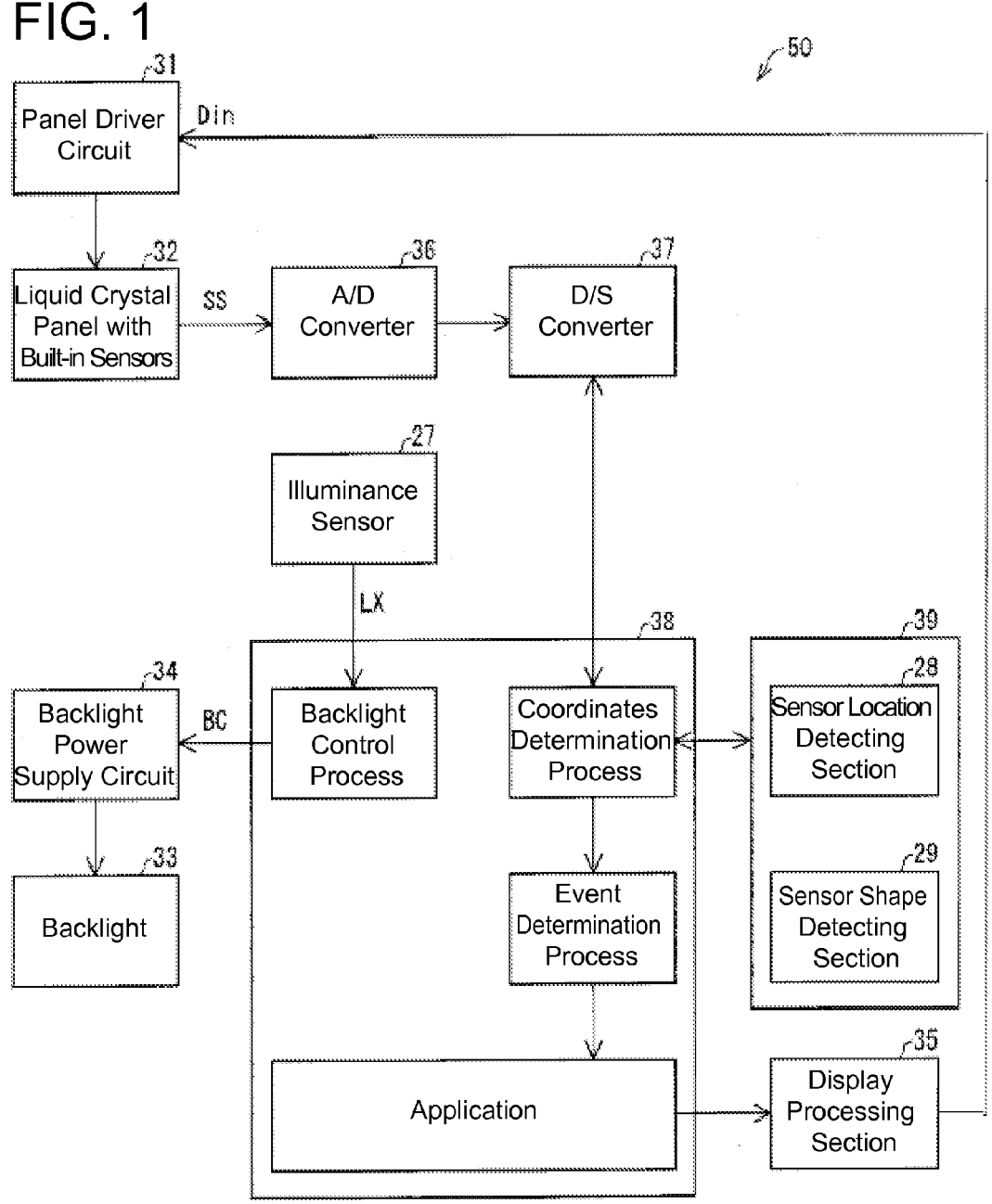
FIG. 1 is a block diagram showing functions of a display device equipped with an input section of the present invention.

An embodiment of the present invention is described in detail below. However, the scope of the present invention is not limited to the descriptions. Embodiments other than described below as an example can also be appropriately modified within the spirit of the present invention. Specifically, the present invention is not limited to embodiments described below. Various changes can be made within the scope of the appended claims. That is, embodiments obtained by combining technological means modified within the scope of appended claims are also included in the technological scope of the present invention.

<Configuration of the Display Device Equipped with an Input Section of the Present Invention>

A display device equipped with an input section of the present invention (for example, a display device equipped with a pen type input section, a light pen system, or the like) includes a display section displaying a main image and an input section for entering location information of the pointer to be displayed on the display section. The input section has a light detecting section that detects light projected from a light-projecting section. A correcting section has a light location detecting section that detects the location of the optical axis of light projected from the light-projecting section. The location information of the pointer is inputted to the light location detecting section as the location of the optical axis of the light. The correcting section has a light shape detecting section that detects the shape of a light-receiving region receiving light projected from the light-projecting section. The display device further includes a pointer location correcting section that corrects the location of the pointer. The pointer location correcting section corrects the location information of the pointer when the light-receiving region shape detected by the light shape detecting section changes.

The light-projecting section used in the present invention is not particularly limited as long as it can project light. For example, it may be a light pen or the like.

Light used in the present invention is not particularly limited. For example, it may be laser light, visible light, ultraviolet light, infrared light, or the like.

The input section used in the present invention is not particularly limited as long as it can detect (receive) light. For example, it may be a plate-shaped member (pad) such as sensor liquid crystals or the like. In this specification, images obtained at the input section are referred to as sub-images.

The display section used in the present invention is not particularly limited as long as it can display a pointer and can display images. For example, it may be a display panel such as a liquid crystal panel or the like. In this specification, images displayed on the display section are referred to as main images.

The pointer used in the present invention is displayed on the display section such as a liquid crystal panel based on the output data from the input section such as sensor liquid crystals. The pointer used in the present invention may be, for example, a cursor showing the location that a pointing device is pointing at on the graphical user interface.

Here, a display device equipped with an input section 50 of the present invention includes an information processing device (not shown). The information processing device may be, for example, MPU (microprocessor unit), CPU (central (computation) processing unit), or the like.

In the display device equipped with an input section 50 of the present invention, the information processing device may be provided separate from the display panel (display section) and the input section (as an external device), provided inside the display panel, or provided inside the input section.

If the information processing device is provided separate from the display panel and the input section, information outputted from the input section is inputted to the information processing device, and the information processing device conducts a process described below (the process conducted by MPU 38). Then, information processed by the information processing device is inputted to the display panel, and on the display panel, images are displayed based on the information processed by the information processing device.

On the other hand, if the information processing device is disposed inside the display panel, information outputted from the input section is inputted to the display panel, and the information processing device disposed inside the display panel conducts a process described below (the process conducted by MPU 38). Then, images are displayed based on the information processed by the information processing device.

If the information processing device is disposed inside the input section, the information processing device disposed inside the input section conducts the process described below (the process conducted by MPU 38). Then, information outputted from the input section is inputted to the display panel, and images are displayed on the display panel based on the information processed by the information processing device.

That is, in the present invention, when it is stated that the display panel (display section) displays a pointer based on the information outputted from the input section, "information" in this context includes both information outputted from the input section and then processed by the information processing device, and information simply outputted from the input section.

In the display device equipped with an input section 50 of the present invention, the above-mentioned pointer location correcting section may be disposed separate from the information processing device, the display panel (display section), and the input section (as an external element), be disposed inside the information processing device, or be disposed inside the display panel.

Preferably, the pointer location correcting section of the display device equipped with an input section of the present invention increases a correction value for the location of the pointer when the area of the light-receiving region becomes smaller.

Also, preferably, the correction value for a rate of change in the light-receiving region area by the pointer location correcting section of the display device equipped with an input section of the present invention is controlled by Equation (1) below:

$$\text{Correction vector} = \text{Movement vector} \times \text{Still image area} / \text{Actual image area} \quad (1)$$

In Equation (1), the size of the correction vector represents the correction value (correction amount), and the size of the movement vector represents the moving amount. Also, the orientation of the correction vector represents the correction direction at the pointer location, and the orientation of the movement vector represents the moving direction of the pointer. Also, in Equation (1), it is assumed that the area of the light-receiving region changes from a still image area to an actual image area.

<Function Block Diagram of the Display Device Equipped with an Input Section of the Present Invention>

FIG. 1 is a function block diagram of the display device equipped with an input section 50 of the present invention. A display device equipped with an input section 50 shown in FIG. 1 includes a panel driver circuit 31, a liquid crystal panel with built-in sensors 32, a backlight 33, a backlight power supply circuit 34, a display processing section 35, an A/D converter 36, an illuminance sensor 27, a microprocessor unit (hereinafter referred to as MPU) 38, and a correcting section 39, as the main components.

Here, the panel driver circuit 31, the liquid crystal panel with built-in sensors 32, the backlight 33, the backlight power supply circuit 34, the A/D converter 36, and the illuminance sensor 27 are included in the display panel (display section) of the display device equipped with an input section 50. The input section is included in the sensor liquid crystals. On the other hand, the display processing section 35 and MPU 38 may be disposed separate from the display panel and the input section (as external members), be disposed inside the display panel, or be disposed inside the input section. Also, the correcting section 39 may be disposed separate from MPU 38, the display panel, and the input section (as an external member), be disposed inside the MPU 38, be disposed inside the display panel, or be disposed inside the input section. In the description below, a case where the correcting section is disposed separate from the MPU 38 is used as an example.

The liquid crystal panel with built-in sensors 32 (hereinafter also referred to as "liquid crystal panel 32") includes a plurality of pixel circuits and a plurality of optical sensors, which are arranged two-dimensionally. The liquid crystal panel 32 is described in detail below.

To the display panel, display data Din, which is outputted from the display processing section 35, is inputted. The inputted display data Din is supplied to the panel driver circuit 31. The panel driver circuit 31 writes a voltage corresponding to the display data Din to the pixel circuit of the liquid crystal panel 32. Thus, on the liquid crystal panel 32, an image based on the display data Din is displayed by the pixels.

The backlight 33 includes a plurality of LEDs (Light Emitting Diode), and projects the light (light from the backlight) to the back surface (the surface on the side opposite from the user) of the liquid crystal panel 32. The backlight power supply circuit 34 switches between sending and not sending the power supply voltage to the backlight 33 in accordance with the backlight control signal BC outputted from MPU 38, which is based on the ambient environmental illumination level LX of the output from of the illuminance sensor 27. Hereinafter, it is assumed that the backlight power supply circuit 34 supplies the power supply voltage when the backlight control signal BC is at a high level, and does not supply the power supply voltage when the backlight control signal BC is at a low level. The backlight 33 turns ON when the backlight control signal BC is at the high level, and turns OFF when the backlight control signal BC is at the low level.

The liquid crystal panel 32 outputs the output signal of the optical sensor as a sensor output signal SS. The A/D converter 36 converts the sensor output signal SS, which is analog, to a digital signal. Then, the D/S converter 37 converts this digital signal to a scan image as necessary.

The MPU 38 and the pointer location correcting section conducts an identification process of the sensor (light) location and the sensor (light) shape from the information detected by the sensor location detecting section (light location detecting section) 28 and the sensor shape detecting section (light shape detecting section) 29 in the correcting section 39 and outputted by the information output section (not shown) based on the sensor output signal SS (digital signal) to determine the pointer coordinates (location) and correction amount (moving amount) and correction direction (moving direction). Specifically, based on the sensor output signal SS (digital signal) from the liquid crystal panel 32 and/or the scan image liquid crystal panel 32, the pointer coordinates (location), the correction amount (moving amount), and the correction direction (moving direction) are calculated. Then, MPU 38 outputs data such as coordinates. After that, MPU 38 conducts an event judgment process based on the outputted data such as coordinates. Specifically, based on the data outputted after the coordinates determination process, such as coordinates, MPU 38 determines how the pen projecting the light (light-projecting section) is moving. For example, MPU 38 determines whether the movement is a gesture process such as a gesture of drawing a straight line or drawing a circle. After that, based on the event judgment, MPU 38 runs an application. Specifically, based on the event judgment, MPU 38 runs a program that performs input and output, and calculation.

After that, based on the information outputted from the program that was run, the display processing section (information output section) 35 conducts a display process. Then, based on the information processed by the display process, the display processing section 35 outputs the display data Din to the panel driver circuit 31 in the display panel.

<Method for Controlling the Display Device Equipped with an Input Section of the Present Invention>

A method for controlling the display device equipped with an input section of the present invention includes a display step in which a main image is displayed on the display section, and an input step in which the location information of the pointer to be displayed on the display section is inputted. The input step includes a light detection step in which the light projected in a light projection step is detected. A correction step includes a light location detection step in which the location of the optical axis of the light projected in the light projection step is detected. The location information of the pointer is inputted to the light location detection step as the location of the optical axis of the light. The correction step includes a light shape detection step in which the shape of the light-receiving region receiving the light projected in the light projection step is detected. The method for controlling the display device further includes a pointer location correction step in which the location of the pointer is corrected. In the pointer location correction step, the location information of the pointer is corrected when the shape of the light-receiving region detected in the light shape detection step changes.

Also, preferably, in the method for controlling the display device equipped with an input section of the present invention, the pointer location correcting section increases the correction value for the location of the pointer when the area of the light-receiving region is reduced.

Also, preferably, in the method for controlling the display device equipped with an input section of the present invention, the correction value for a rate of change in the light-receiving region area is controlled by Equation (1) in the pointer location correction step.

Specifically, the method for controlling the display device equipped with an input section of the present invention is controlled according to the function block diagram of the display device equipped with an input section 50 of the present invention shown in FIG. 1.

Here, the display step is controlled by the display section, the input step is controlled by the input section, the light projection step is controlled by the light-projecting section, the light location detection step is controlled by the sensor location detecting section (light location detecting section 28), the light shape detection step is controlled by the sensor shape detecting section (light shape detecting section 29), and the pointer location correction step is controlled by the pointer location correcting section (pointer location correcting section).

<Detailed Description of the Configuration of the Display Device Equipped with an Input Section of the Present Invention>

The display device equipped with an input section of the present invention is described in detail with reference to FIG. 2(a), FIG. 2(b), FIG. 3(a), and FIG. 3(b).

As shown in FIG. 2(a), FIG. 3(a), and FIG. 3(b), when the location of the light is (A), the pointer is shown at location (A) in the display section. However, by the time the pointer is displayed at location (A) in the display section, the light has already moved to location (B). As a result, the location of the light does not match the location of the pointer in the display section.

To solve this problem, as shown in FIG. 2(b), from the shape of the light-receiving region, a correction value (correction amount, moving amount) for the location of the pointer in the display section is derived, and the location of the pointer is corrected accordingly to the direction of the vector connecting the previously detected light location and the currently detected light location.

As shown in FIG. 2(b), the shapes of the light-receiving regions (A), (B), and (C) are smaller than (0), and therefore the pointer location is corrected. Here, because the shape of the light-receiving region (A) is smaller than the shape of the light-receiving region (0), the light is moved from (0) to (A) with an increasing moving amount, i.e., an increasing acceleration. Also, because the shape of the light-receiving region (B) is larger than the shape of the light-receiving region (A), the light is moved from (A) to (B) with a decreasing moving amount, i.e., a decreasing acceleration. Because the shape of the light-receiving region (C) is smaller than the shape of the light-receiving region (B), the light is moved from (B) to (C) with an increasing moving amount, i.e., an increasing acceleration.

In the display device equipped with an input section of the present invention, the light projection is controlled by a shutter. As a result, the greater the increase in the moving amount of the pen (light-projecting section), i.e., the greater the increase in the acceleration, the illuminance of the light detected by the sensors decreases.

A sensor image (sensor location and sensor shape, the light location and the shape of the light-receiving region) is obtained with a shutter speed of 60 Hz, 120 Hz, or the like. Therefore, the slower the movement of the pen (light-projecting section), the larger the sensor shape (shape of the light-receiving region) becomes. Consequently, the largest shape of the light-receiving region is considered as the shape of the light-receiving region obtained when the pen is still, and when the shape of the current light-receiving region is smaller and the location of the light (coordinates) are changing, the pointer location is corrected.

In the present invention, the shutter speed is not limited to 60 Hz or 120 Hz. The faster the shutter speed is, the smoother the operation becomes.

That is, if the currently detected shape of the light-receiving region is smaller than the previously detected one, it suggests that the light is being moved with an increasing moving amount, i.e., with an increasing acceleration. On the other hand, if the currently detected shape of the light-receiving region is larger than the previously detected one, it suggests that the light is being moved with a decreasing moving amount, i.e., with a decreasing acceleration.

Also, in the display device equipped with an input section of the present invention, the sensor image (sensor location and sensor shape, or the light location and the shape of the light-receiving region) is saved as a history, and is referenced when a vector is obtained.

<Input Section of the Display Device Equipped with an Input Section of the Present Invention>

The input section of the display device equipped with an input section of the present invention includes a light detecting section that detects light projected from the light-projecting section. Further, the correcting section includes a light location detecting section and a light shape detecting section. The light location detecting section detects the location of the light projected from the light-projecting section, and the light shape detecting section detects the shape of the light-receiving region formed when light is projected from the light-projecting section.

Here, the input section in the present invention may be a pen type input section, input section (input device) of a digitizer, tablet, or the like.

An input section in a display device equipped with an input section of the present invention has the configuration and functions of input sections known to the public, in addition to the configuration and functions discussed in the description of the function block diagram.

<Display Panel of the Display Device Equipped with an Input Section of the Present Invention>

Figure 4:
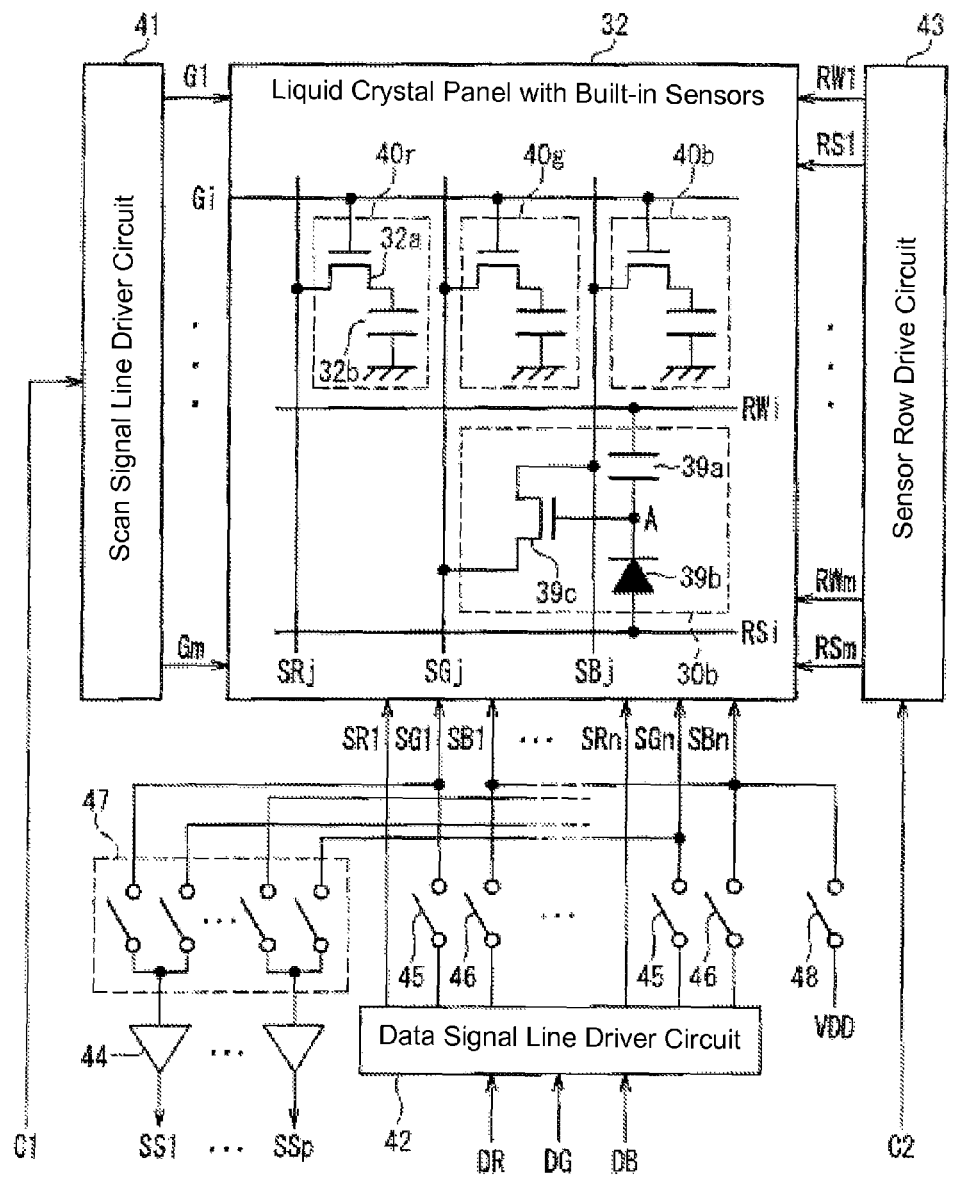
FIG. 4 schematically shows the circuit configuration of the display panel (display section) of the present invention.

FIG. 4 is a circuit block diagram showing the circuit configuration of the liquid crystal panel 32 in the present invention and the configuration of its peripheral circuits. FIG. 4 shows an example case in which the RGB color filters are arranged in stripes, where an optical sensor 30b is disposed such that a photodiode 39b is located in the same column as a blue picture element 40b, i.e., the photodiode 39b is located on the back surface of the blue filter. The color filters may be arranged in shapes other than stripes, such as mosaic shapes or delta shapes.

In other pixels, which are not shown in FIG. 4, an optical sensor 30r is disposed such that a photodiode 39r is located on the back surface of the red filter which is shared with a red picture element 40r. The number of the optical sensors 30b of the blue picture element 40b and the number of the optical sensors 30r of the red picture element 40r are about the same, and they are both arranged in a regular pattern.

Figure 5:
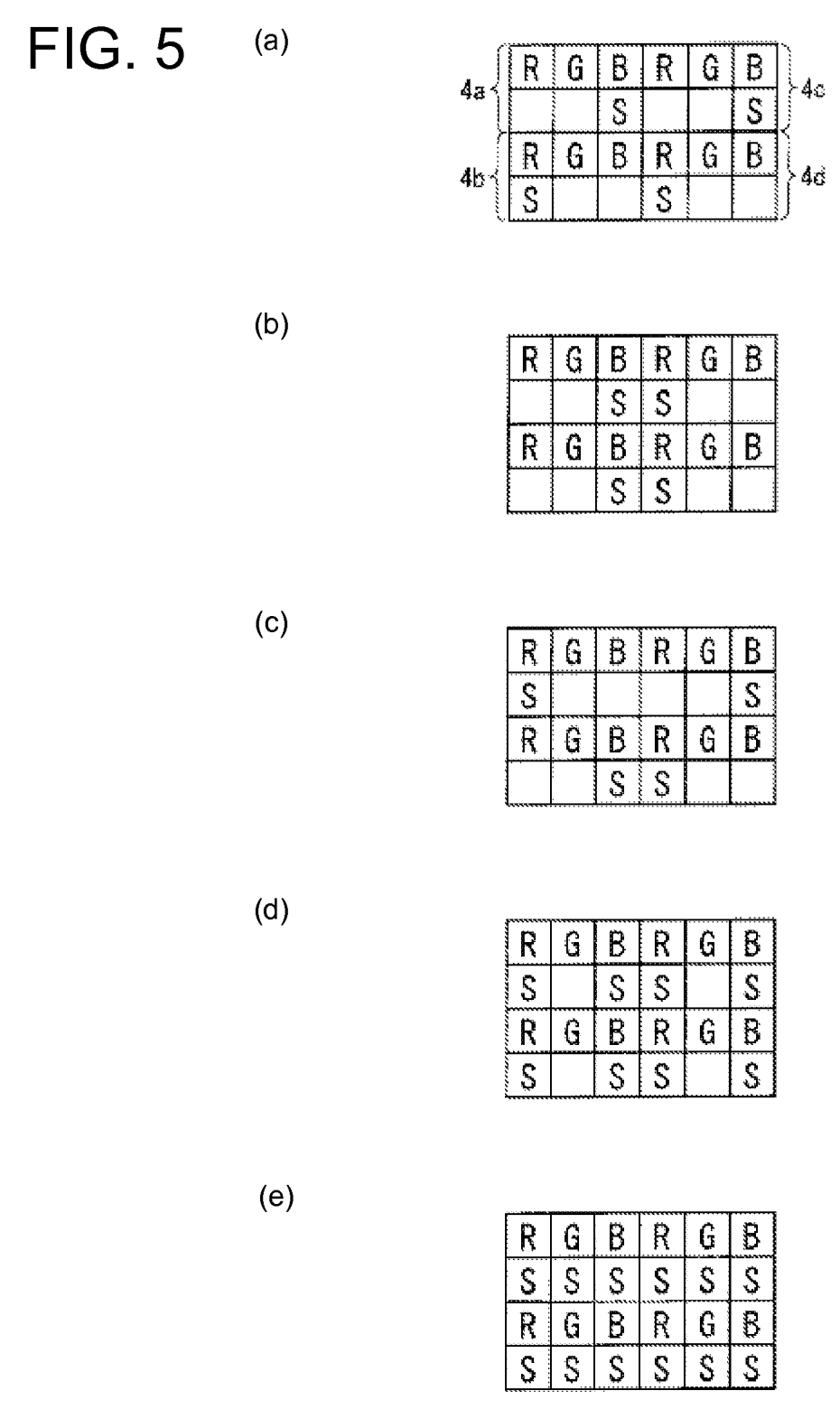

FIG. 5(a) schematically shows an example of the arrangement of optical sensors 30 in this case. In this figure, "R", "G", and "B" denote the red picture element, green picture element, and blue picture element, respectively. "S" denotes an optical sensor. In pixels 4a and 4c, the optical sensor "S" is disposed with the blue picture element "B", and in pixels 4b and 4d, the optical sensor "S" is disposed with the red picture element 4b.

In FIG. 5(a), for every horizontal line, the optical sensors "S" are arranged with a picture element that is different from the previous horizontal line. However, the arrangement rule is not limited to such. For example, as shown in FIG. 5(b), optical sensors "S" may be arranged with a different picture element for every vertical line. Also, as shown in FIG. 5(c), optical sensors "S" may be arranged with a different picture element for every adjacent pixel. Further, as shown in FIG. 5(d) or FIG. 5(e), optical sensors "S" may be disposed with all picture elements.

Here, if the optical sensor "S" is disposed with the green picture element 4g, in FIG. 4, the optical sensor 30g is disposed such that the photodiode 39g is located on the back surface of the green filter shared with the green picture element 40g. Also, the number of the optical sensors 30b of the blue picture element 40b and the number of the optical sensors 30g of the green picture element 40g are about the same, and they are both arranged in a regular pattern.

Described below is an example in which the optical sensor 30b, which is disposed such that the photodiode 39b is located on the back surface of the blue filter in the same column with the blue picture element 40b, outputs the sensor output signal.

As shown in FIG. 4, the liquid crystal panel 32 includes m scan signal lines G1 to Gm; 3n data signal lines SR1 to SRn, SG1 to SGn, and SB1 to SBn; and (m×3n) pixel circuits 40 (40r, 40g, and 40b). It also includes (m×n) optical sensors 30; m sensor read-out lines RW1 to RWm; and m sensor reset lines RS1 to RSm.

The scan signal lines G1 to Gm are arranged in parallel to each other. The data signal lines SR1 to SRn, SG1 to SGn, and SB1 to SBn are arranged in parallel to each other such that they intersect with the scan signal lines G1 to Gm at a right angle. The sensor read-out lines RW1 to RWm and the sensor reset lines RS1 to RSm are disposed in parallel to the scan signal lines G1 to Gm.

One of the pixel circuits 40 (40r, 40g, and 40b) is disposed near each of the intersections of the scan signal lines G1 to Gm and the data signal lines SR1 to SRn, SG1 to SGn, SB1 to SBn. The pixel circuits 40 are, as a whole, arranged two-dimensionally, with m circuits disposed in the column direction (vertical direction in FIGS. 4), and 3n circuits disposed in the row direction (horizontal direction in FIG. 4).

The pixel circuits 40 can be categorized by the color of the color filter provided: red (R) pixel circuit 40r, green (G) pixel circuit 40g, and blue (B) pixel circuit 40b. The three types of pixel circuits 40r, 40g, and 40b (hereinafter also individually referred to as "picture element (sub-pixel)") are arranged in the row direction, and three of them jointly form one pixel.

The pixel circuit 40 includes a TFT (Thin Film Transistor) 32a and a liquid crystal capacitance 32b. The gate terminal of TFT 32a is connected to the scan signal line Gi (i is an integer of at least 1 and no greater than m), the source terminal is connected to one of the data signal lines SRj, SGj, and SBj (j is an integer of at least 1 and no greater than n), and the drain terminal is connected to one of the electrodes of the liquid crystal capacitance 32b. The common electrode voltage is applied to the other electrode of the liquid crystal capacitance 32b. Hereinafter, data signal lines SG1 to SGn connected to the green (G) pixel circuit 40g are referred to as G data signal lines, and data signal lines SB1 to SBn connected to the blue (B) pixel circuit 40b are referred to as B data signal lines. The pixel circuit 40 may include an auxiliary capacitance.

The transmittance (luminance of the picture element) of the pixel circuit 40 is determined by the voltage written to the pixel circuit 40. To write a voltage to the pixel circuit 40 connected to the scan signal line Gi and to the data signal line SXj (X is R, G, or B), a high level voltage (voltage that turns TFT 32a ON) can be applied to the scan signal line Gi, and a voltage to be written can be applied to the data signal line SXj. The luminance of the picture element can be set to a desired level by writing a voltage representing the display data Din to the pixel circuit 40.

The optical sensor 30 includes a capacitor 39a, a photodiode 39b, and a sensor preamplifier 39c, and is disposed at least for each blue picture element 40b (blue (B) pixel circuit 40b).

One electrode of the capacitor 39a is connected to the cathode terminal of the photodiode 39b (hereinafter, this connecting point is referred to as "contact A"). The other electrode of the capacitor 39a is connected to the sensor read-out line RWi, and the anode terminal of the photodiode 39b is connected to the sensor reset line RSi. The sensor preamplifier 39c is constituted of a TFT whose gate terminal is connected to contact A, the drain terminal is connected to B data signal line SBj, and the source terminal is connected to G data signal line SGj.

Figure 6:
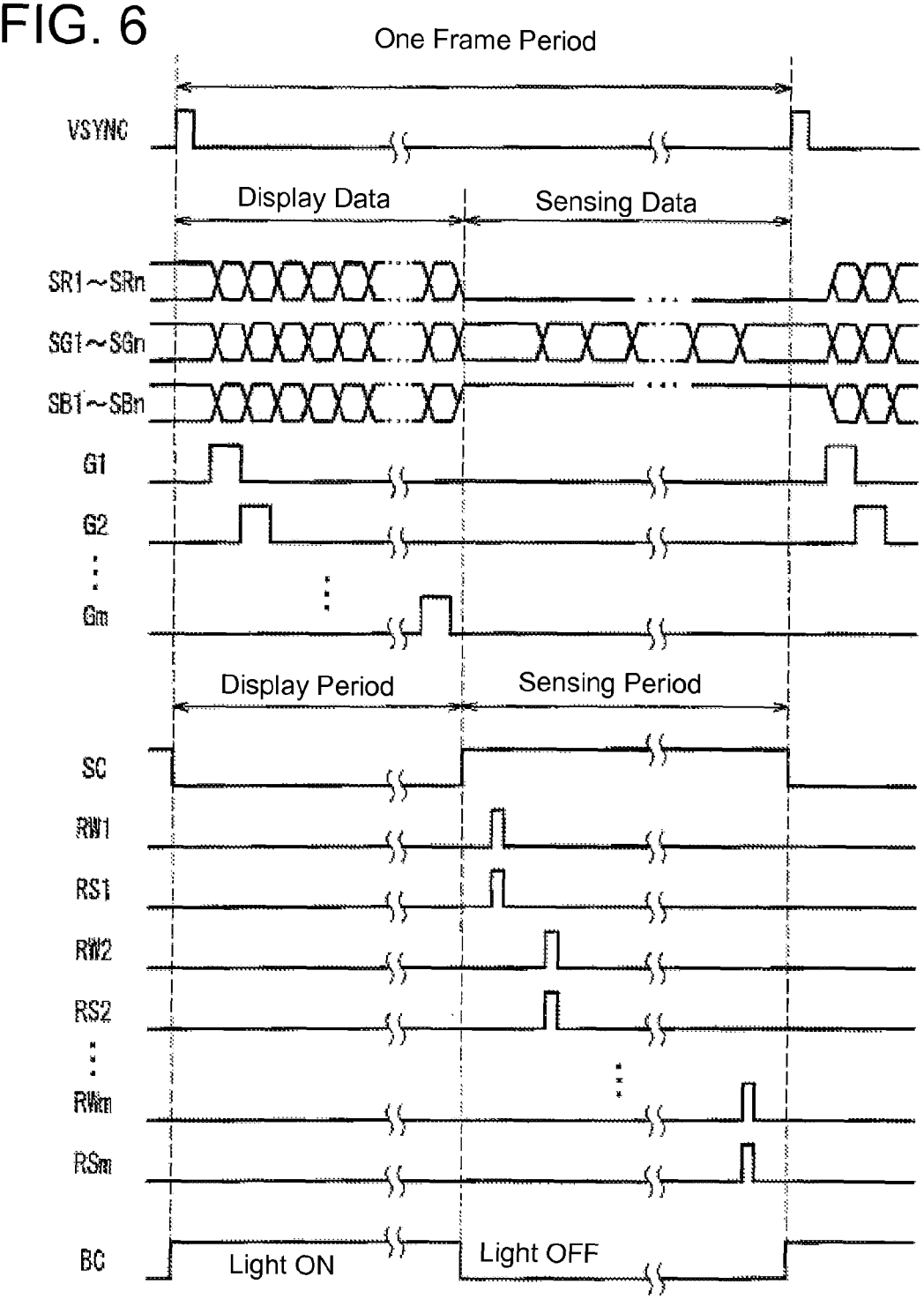
FIG. 6 is a timing chart showing the voltage application states of the display device equipped with an input section of the present invention.

To detect the light amount at the optical sensor 30 connected to the sensor read-out line RWi, the B data signal line SBj, and the like, a prescribed voltage can be applied to the sensor read-out line RWi and to the sensor reset line RSi, and a power supply voltage VDD can be applied to the B data signal line SBj at the timings shown in the timing chart of FIG. 6. After the prescribed voltage is applied to the sensor read-out line RWi and to the sensor reset line RSi, when light enters the photodiode 39b, the current representing the amount of the light entered flows to the photodiode 39b, and the voltage at contact A decreases according to the current that flowed. When the power supply voltage VDD is applied to the B data signal line SBj, the voltage at contact A is amplified by the sensor preamplifier 39c, and the amplified voltage is outputted to the G data signal line SGj. Therefore, based on the voltage at the G data signal line SGj, the amount of light detected by the optical sensor 30 can be obtained.

In the periphery of the liquid crystal panel 32, a scan signal line driver circuit 41, a data signal line driver circuit 42, a sensor row driver circuit 43, p (p is an integer of at least 1 and no greater than n) sensor output amplifiers 44, and a plurality of switches 45 to 48 are provided. The scan signal line driver circuit 41, the data signal line driver circuit 42, and the sensor row driver circuit 43 are equivalent to the panel driver circuit 31 in FIG. 1.

The data signal line driver circuit 42 has 3n output terminals corresponding to 3n data signal lines. One switch 45 is provided between each of G data signal lines SG1 to SGn and the corresponding one of n output terminals, and one switch 46 is provided between each of B data signal lines SB1 to SBn and the corresponding one of n output terminals. G data signal lines SG1 to SGn are divided into groups of p lines. Within each of the groups, one switch 47 is provided between the kth (k is an integer of at least 1 and no greater than p) G data signal line and the input terminal of the kth sensor output amplifier 44. B data signal lines SB1 to SBn are all connected to one end of the switch 48, and to the other end of the switch 48, the power supply voltage VDD is applied. The number of the switches 45 to 47 included in FIG. 4 is n, and there is only one switch 48.

Circuits shown in FIG. 4 operate differently between during the display period and during the sensing period. During the display period, switches 45 and 46 turn ON, and switches 47 and 48 turn OFF. On the other hand, during the sensing period, switches 45 and 46 turn OFF, switch 48 turns ON, and switch 47 turns ON in a time-division manner such that each groups of G data signal lines SG1 to SGn are connected sequentially to the input terminal of the sensor output amplifier 44.

During the display period shown in FIG. 6, the scan signal line driver circuit 41 and the data signal line driver circuit 42 operate. The scan signal line driver circuit 41 selects one of the scan signal lines G1 to Gm per one line time as instructed by the timing control signal C1, applies a high-level voltage to the selected scan signal line, and applies a low-level voltage to the remaining scan signal lines. The data signal line driver circuit 42 drives the data signal lines SR1 to SRn, SG1 to SGn, and SB1 to SBn in a linear sequential manner based on the display data DR, DG, and DB.

More specifically, the data signal line driver circuit 42 stores the display data DR, DG, and DB at least one line at a time, and for each line time, applies a voltage representing the one line of display data to the data signal lines SR1 to SRn, SG1 to SGn, and SB1 to SBn. The data signal line driver circuit 42 may drive the data signal lines SR1 to SRn, SG1 to SGn, and SB1 to SBn in a dot sequential manner.

During the sensing period shown in FIG. 6, the sensor row driver circuit 43 and the sensor output amplifier 44 operate. The sensor row driver circuit 43 selects one of the sensor read-out lines RW1 to RWm and one of the sensor reset lines RS1 to RSm per one line time as instructed by the timing control signal C2, applies a prescribed read-out voltage and a prescribed reset voltage to the selected sensor read-out line and the selected sensor reset line, respectively, and applies a different voltage to other signal lines. Typically, one line time duration is different between during the display period and during the sensing period. The sensor output amplifier 44 amplifies the voltage selected by the switch 47, and outputs the voltage as the sensor output signals SS1 to SSp.

In FIG. 6, the backlight control signal BC becomes high during the display period, and becomes low during the sensing period. In this case, the backlight 33 turns on during the display period, and turns off during the sensing period. As a result, the influence of the light from the backlight on the photodiode 39b can be reduced.

Figure 7:
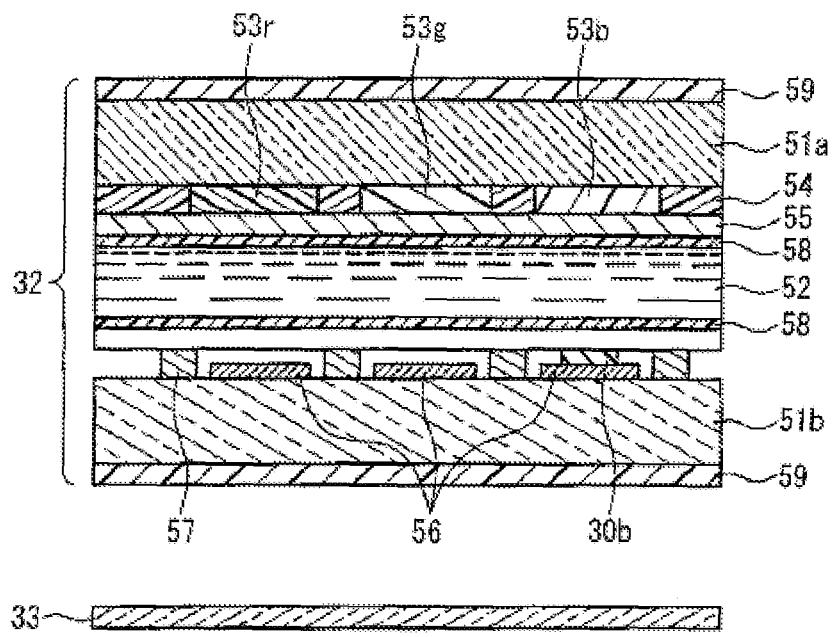
FIG. 7 is a cross-sectional view schematically showing the display panel (display section) of the present invention.

FIG. 7 is a cross-sectional view showing an example of the configuration of the liquid crystal panel 32 of the present invention. The liquid crystal panel 32 has a configuration in which, for example, a liquid crystal layer 52 is sandwiched between two glass substrates 51a and 51b. Over one of the glass substrates, i.e., a glass substrate 51a, three color filters 53r, 53g, and 53b, light-shielding films 54, an opposite electrode 55, and the like, for example, are provided. Over the other glass substrate, i.e., the glass substrate 51b, pixel electrodes 56, data signal lines 57, an optical sensor 30, and the like, for example, are provided.

The optical sensor 30 is disposed near the pixel electrode 56 with, for example, the blue color filter 53b. In this case, preferably, at least the photodiode 39b of the optical sensor 30 is disposed at the center of the color filter 53 on the back surface so that the light transmitted by the color filter 53 is reliably received by the photodiode 39b.

On each of the surfaces of the glass substrates 51a and 51b, which surfaces are facing each other, an alignment film 58 is provided, and on each of the other surfaces, a polarizing plate 59 is provided. Of the two surfaces of the liquid crystal panel 32, the surface on the side of the glass substrate 51a is the front surface, and the surface on the side of the glass substrate 51b is the back surface. The backlight 33 is disposed facing the back surface of the liquid crystal panel 32.

Figure 8:
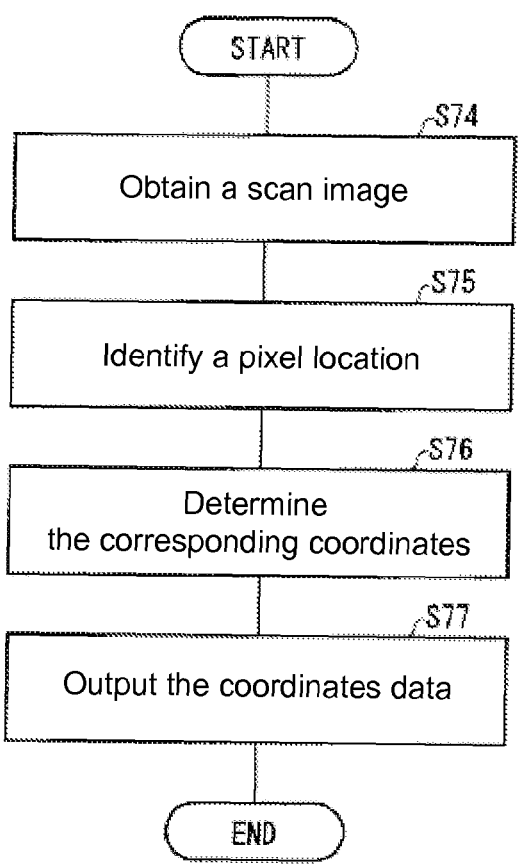
FIG. 8 is a flowchart showing an example of the process conducted by the display device equipped with an input section of the present invention, for detecting the location at which the light is projected.
Figure 10:
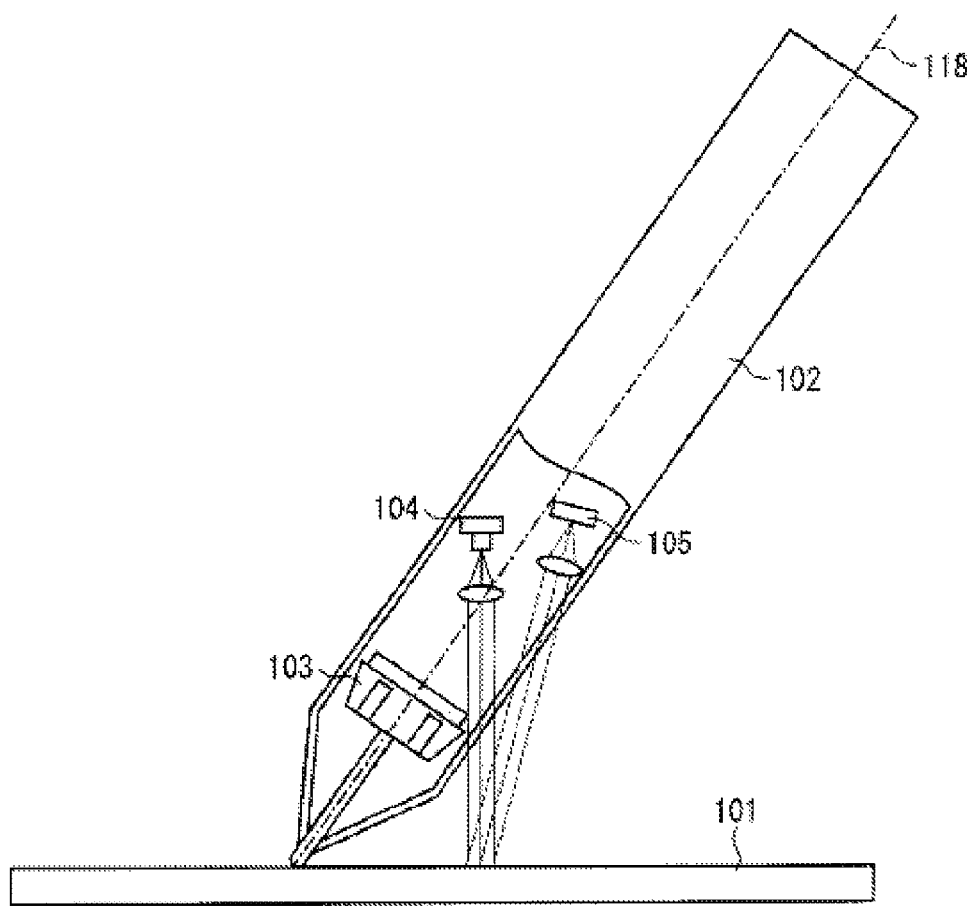
FIG. 10 is a cross-sectional view showing the configuration of a conventional pen type input device (input section).

FIG. 8 is a flowchart showing an example of the process for identifying the location of the light projection in the display device equipped with an input section 50 of the present invention. The process shown in FIG. 8 is performed by MPU 38 shown in FIG. 1 within a frame time.

The A/D converter 36 (see FIG. 1) converts the analog output signal SS outputted from the optical sensor 30 included in the liquid crystal panel 32 to a digital signal.

MPU 38 obtains this digital signal as a scan image (step S74). Further, the MPU 38 performs a process on the scan image obtained for identifying a pixel location (step S75).

Figure 9:
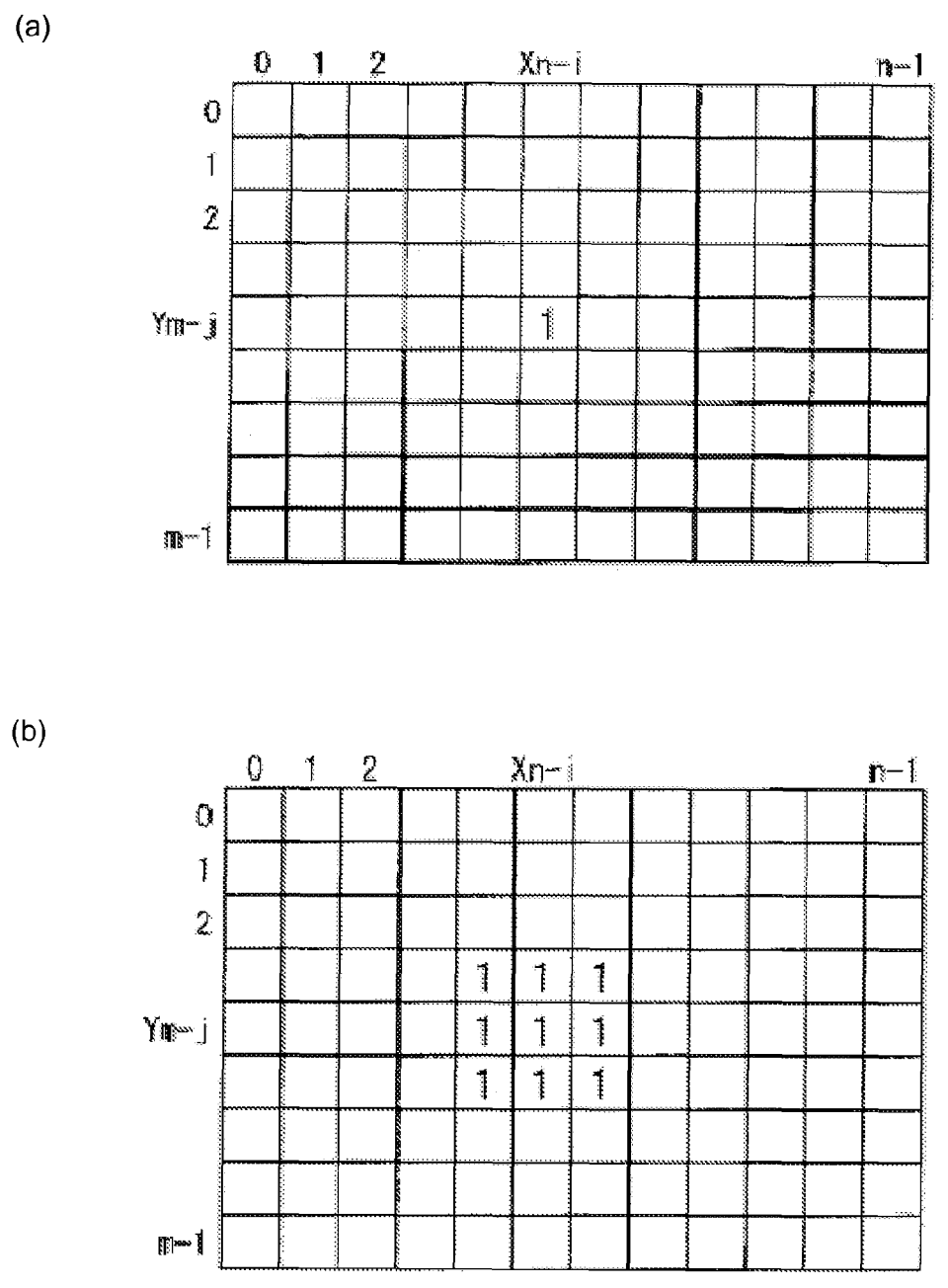

For example, FIG. 9(a) schematically shows a scan image having m×n pixels. As shown in FIG. 9(a), if the scan image is binarized based on a prescribed threshold, a pixel with a value of "1" is determined as a pixel at which light is projected, and the pixel location of this pixel is identified. FIG. 9(a) shows the identified location of a pixel (Xn-i, Ym-j).

On the other hand, FIG. 9(b) shows a scan image when light is projected to a plurality of pixels. Pixel locations identified in this case include eight pixels adjacent to the pixel location (Xn-i, Ym-j). The scan image shown in FIG. 9(b) is obtained when the arrangement rule shown in FIG. 5(d) or FIG. 5(e) is used.

Once the pixel location is identified, MPU 38 conducts a process that determines the coordinates (location) within the image corresponding to the identified pixel (step S76). For example, as shown in FIG. 9(a), coordinates corresponding to the identified pixel location (Xn-i, Ym-j) is determined. If the image resolution of the displayed image and the display resolution of the liquid crystal panel match and they are both "m×n", the pixel location (Xn-i, Ym-j) is determined as the coordinates (location). If the image resolution and the display resolution do not match, the coordinate conversion can be conducted to determine the coordinates (location) corresponding to the pixel location.

As shown in FIG. 9(b), if the eight pixel locations including the pixel location (Xn-i, Ym-j) are identified, the coordinates (location) can be determined based on a prescribed rule. For example, the coordinates (location) can be determined based on the pixel closest to the weighted center of the identified pixels. In this case, as shown in FIG. 9(b), of the plurality of pixels with the value of "1", the pixel location corresponding to the weighted center (Xn-i, Ym-j) can be determined. Alternatively, in FIG. 9(b), the coordinates that correspond to all pixel locations with the value of "1" may be determined as the coordinates (location).

Once the coordinates (location) are determined, MPU 38 outputs the coordinates data at the determined coordinates to the panel driver circuit 31 in the display panel (step S77).

In the display device equipped with an input section 50 of the present invention, the process for identifying the location and the shape of the light projected is conducted as described below. This process is conducted by MPU 38 shown in FIG. 1.

The A/D converter 36 (see FIG. 1) converts the analog output signal SS outputted from the optical sensor 30 included in the liquid crystal panel 32 to a digital signal. Then, MPU 38 obtains this digital signal as the sensor image.

Thus, from the sensor image obtained, MPU 38 can conduct a process for identifying the edge extraction image.

When the edge extraction image is identified, MPU 38 conducts a process for determining the moving direction for the identified edge extraction image. When the moving direction is determined, MPU 38 outputs the data found in the determined moving direction to the panel driver circuit 31 in the display panel.

<Examples of Realization of the Display Device Equipped with an Input Section of the Present Invention Using a Program>

Each block (configuration) of a display device equipped with an input section of the present invention may be configured with hardware logic, or may be realized with software using a CPU as described below.

That is, a display device equipped with an input section of the present invention includes: a CPU (central processing unit) that executes instructions of a control program for realizing individual functions; a ROM (read only memory) that stores the program; a RAM (random access memory) that decompresses the program; and a storage device (recording medium) such as a memory that stores the program and various data. The objectives of the present invention can also be realized by providing the above-mentioned display device equipped with an input section with a recording medium that stores the program code (executable program, intermediate code program, source program) of the control program of the display device equipped with an input section, i.e., a software for realizing the above-mentioned functions, in a format readable by a computer (or CPU or MPU), and by having the computer retrieve the program codes stored in the recording medium and execute them.

The recording medium can be, for example, a tape such as a magnetic tape or a cassette tape; a disk including a magnetic disk such as a floppy (registered trademark) disk or a hard disk, an optical disk such as a CD-ROM, MO, MD, DVD, or CD-R; a card such as an IC card (including a memory card) or optical card; or a semiconductor memory such as a mask ROM, EPROM, EEPROM, or flash ROM.

The display device equipped with an input section may be configured to be connectable to a communication network, and the above-mentioned program code may be supplied via the communication network. The communication network is not particularly limited. As the communication network, the internet, intranet, extranet, LAN, ISDN, VAN, CATV communication net, virtual private network, telephone network, mobile communication network, satellite communication network, and the like, for example, can be used. Also, the transmission medium constituting the communication network is not particularly limited. As the transmission medium constituting the communication network, wires such as IEEE1394, USB, power line carrier, cable TV network, telephone line, ADSL network, or radio such as infrared (for example, IrDA or remote control), Bluetooth (registered trademark), 802.11 radio, HDR, mobile telephone network, satellite network, digital terrestrial network, for example, can be used. The present invention can also be realized using computer data signals embedded in a carrier wave, in which the above-mentioned program code is presented in the form of electronic transmission.

Preferred Embodiments of the Present Invention

In the display device equipped with an input section of the present invention, preferably the pointer location correcting section increases the correction value for the pointer location when the area of the light-receiving region becomes smaller.

Thus, the display device equipped with an input section of the present invention can easily determine the corrected location of the pointer, and therefore can be operated even more accurately.

Also, preferably, the correction value for a rate of change in the light receiving region area by the pointer location correcting section of the display device equipped with an input section of the present invention is controlled by Equation (1) below:

$$\text{Correction vector} = \text{Movement vector} \times \text{Still image area} / \text{Actual image area} \quad (1)$$

Thus, in the display device equipped with an input section of the present invention, the correction amount (moving amount) from the pointer location before correction can easily be determined, and therefore the display device can be operated even more easily and accurately.

In the method for controlling the display device equipped with an input section of the present invention, preferably the correction value for the pointer location is increased in the pointer location correction step when the area of the light-receiving region becomes smaller.

Thus, according to the method of controlling the display device equipped with an input section of the present invention, the corrected pointer location can easily be determined, and therefore the display device can be controlled even more accurately.

Also, in the method for controlling the display device equipped with an input section of the present invention, preferably the correction value for a rate of change in the light-receiving region area is controlled in the pointer location correction step by Equation (1) below:

$$\text{Correction vector} = \text{Movement vector} \times \text{Still image area} / \text{Actual image area} \quad (1)$$

Thus, according to the method for controlling the display device equipped with an input section of the present invention, because the correction amount (moving amount) from the pointer location before correction can easily be determined, the display device equipped with an input section of the present invention can be controlled even more easily and accurately.

The control program of the present invention operates the display device equipped with an input section, and is designed to make a computer operate as individual sections described above. Also, a recording medium of the present invention can be read by a computer storing the control program described above.

Thus, a display device equipped with an input section according to the present invention can be realized by a computer.

Other Embodiments

The specific embodiments described above are merely for illustration of the technical contents of the present invention. The present invention shall not be narrowly interpreted by being limited to such specific examples. Various changes can be made within the spirit of the present invention and the scope as defined by the appended claims.

INDUSTRIAL APPLICABILITY

The display device equipped with an input section of the present invention can be employed in display devices such as personal computers, electronic dictionaries, car navigation devices, mobile information terminals, game devices, and electronic blackboards.

| Description of Reference Characters |
| --- |
| 27 illuminance sensor |
| 28 sensor location detecting section (optical location detecting section) |
| 29 sensor shape detecting section (light shape detecting section) |
| 30 optical sensor |
| 31 panel driver circuit |
| 32 liquid crystal panel with built-in sensors |
| 33 backlight |
| 34 backlight power supply circuit |
| 35 display processing section |
| 36 A/D converter |
| 37 D/S converter |
| 38 microprocessor unit (MPU) |
| 39 correcting section |
| 41 scan signal line driver circuit |
| 42 data signal line driver circuit |
| 43 sensor row driver circuit |
| 44 sensor output amplifier |
| 45 switch |
| 46 switch |
| 47 switch |
| 48 switch |
| 50 display device equipped with an input section |

The invention claimed is:

1. A display device equipped with an input section comprising:
    a display section that displays a main image; and
    an input section for inputting location information of a pointer to be displayed on said display section,
    wherein said input section includes a light detecting section that detects light projected from a light-projecting section,
    wherein a correcting section includes a light location detecting section that detects an optical axis of light projected from said light-projecting section, and location information of said pointer is inputted to said light location detecting section as the location of the optical axis of the light,
    wherein said correcting section includes a light shape detecting section that detects a shape of a light-receiving region receiving light from said light-projecting section,
    wherein said display device further comprises a pointer location correcting section that corrects locations of said pointer, and
    wherein said pointer location correcting section corrects the location information of said pointer when the shape of said light-receiving region detected by said light shape detecting section changes.

2. The display device equipped with an input section according to claim 1, wherein said pointer location correcting section increases a correction value for the pointer location when the area of said light-receiving region becomes smaller.

3. The display device equipped with an input section according to claim 2, wherein said correction value of said pointer location correcting section, said correction value being determined by a rate of change in the area of said light-receiving region, is controlled by Equation (1) below:

Correction vector=Movement vector×Still image area/Actual image area    (1).

4. A control program for operating the display device equipped with an input section according to claim 1, wherein said control program makes a computer function as said individual sections.

5. A recording medium that stores the control program according to claim 4, and is readable by a computer.

6. A method for controlling the display device equipped with an input section, comprising: a display step in which a main image is displayed on a display section; and an input step in which location information of the pointer to be displayed on said display section is inputted,
   wherein said input step includes a light detection step in which light projected in a light projection step is detected,
   wherein a correction step includes a light location detection step in which the location of an optical axis of light projected in said light projection step is detected, and the location information of the pointer is inputted to said light location detection step as the location of the optical axis of light,
   wherein said correction step includes a light shape detection step in which a shape of the light-receiving region receiving light projected in the light projection step is detected,
   wherein said method for controlling the display device further comprises a pointer location correction step in which the location of the pointer is corrected, and
   wherein in said pointer location correction step, the location information of the pointer is corrected when the shape of the light-receiving region detected in said light shape detection step changes.

7. The method for controlling the display device equipped with an input section according to claim 6, wherein in said pointer location correction step, the correction value for the pointer location is increased when the area of the light-receiving region becomes smaller.

8. The method for controlling the display device equipped with an input section according to claim 7, wherein in said pointer location correction step, said correction value for a rate of change in the area of said light-receiving region is controlled by Equation (1) below:

Correction vector=Movement vector×Still image area/Actual image area    (1).

* * * * *